R. T. HOLMES.
WRECKING TRUCK.
APPLICATION FILED NOV. 22, 1913.
1,117,049.
Patented Nov. 10, 1914.
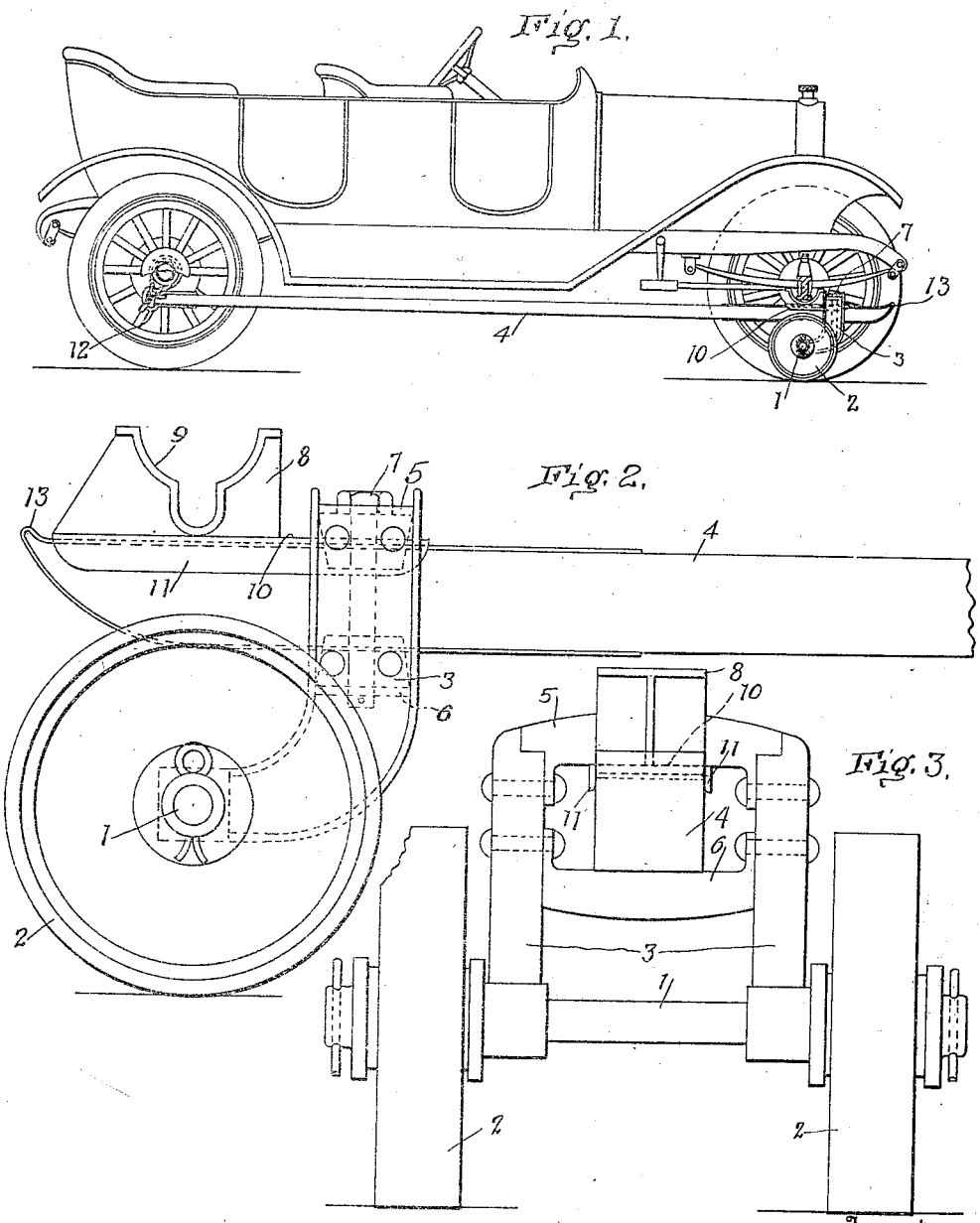
Witnesses
G. Howard Walmsley.
Harriet L. Hammaker.
Inventor
Robert T. Holmes,
By Townsend & Reed
Attorneys

UNITED STATES PATENT OFFICE.

ROBERT T. HOLMES, OF DANVILLE, ILLINOIS, ASSIGNOR TO ROBT. HOLMES & BROS., (INCORPORATED,) OF DANVILLE, ILLINOIS, A CORPORATION OF ILLINOIS.

WRECKING-TRUCK.

1,117,049.     Specification of Letters Patent.     Patented Nov. 10, 1914.

Application filed November 22, 1913. Serial No. 802,440.

*To all whom it may concern:*

Be it known that I, ROBERT T. HOLMES, a citizen of the United States, residing at Danville, in the county of Vermilion and State of Illinois, have invented certain new and useful Improvements in Wrecking-Trucks, of which the following is a specification, reference being had therein to the accompanying drawing.

This invention relates to wrecking trucks, and is more particularly designed to support one end of the axle of an automobile or other vehicle, which has lost a wheel while the vehicle is being towed home.

The object of the invention is to provide a wheeled support for the axle, which will be very simple in its construction and can be readily placed in position and attached to the wrecked vehicle; to so construct the device that the load will be supported substantially in the same vertical plane with the axis of the truck; to provide such a device which will be reversible, so that it can be readily adapted to support either the front axle or the rear axle of the vehicle; and to so construct and arrange the several parts of the device that it will be not only simple, but very strong, and can be readily transported from one place to another when not in use.

In the accompanying drawings Figure 1 is a side elevation of an automobile, showing a truck embodying my invention supporting the front axle thereof. Fig. 2 is a side elevation of the truck, showing the same adjusted to support the rear axle of a vehicle, and having a part of the pole broken away; and Fig. 3 is an end elevation of the truck.

In these drawings I have illustrated one embodiment of my invention, and have shown the same as comprising a wheeled supporting device, having secured thereto a pole or device by which the wheeled support may be manipulated and provided with a suitable rest or socket to receive the axle which is to be supported and retain the same in position.

The particular construction of the several parts of the invention is capable of material variation from the form here shown, which form has been chosen for the purpose of illustration only.

In the particular form of the device here illustrated the wheeled support comprises an axle 1, having at each end thereof wheels 2. Mounted upon the axle 1 is a supporting frame comprising side members 3 rigidly connected at their upper ends and adapted to have connected thereto a manipulating device or pole 4. As here shown the side members 3 of the frame are substantially L-shaped, the free ends of the horizontal portions being connected with the axle 1. The vertical portions of the frame members are connected by transverse bars 5 and 6 which are spaced apart to receive between them the pole 4. The pole may be secured to the frame in any suitable manner, but I have here shown a pin 7 which extends through the transverse connecting members 5 and 6 of the frame, and through the pole, thus affording a very strong connection which can be readily released. The connection between the supporting frame and the pole 4 is preferably made at a point somewhat remote from the end of the pole, thus causing the end of the pole to project beyond the frame and above the axle which is mounted in the horizontal portions of the frame members. I also prefer to provide the projecting end of the pole with a suitable rest or socket to receive the axle which is to be supported, and hold the same against movement longitudinally of the pole. As here shown, this socket comprises a block 8 having a recess 9 shaped to receive the axle. The block 8 is rigidly secured to and preferably formed integral with a plate 10 which projects beyond the end of the block 8, and is adapted to be extended between the pole 4 and the transverse bar 5, and which is provided with an aperture through which the pin 7 extends. In this manner the pin 7 serves to fasten together the supporting frame, the pole and the axle socket. The plate may also be provided with flanges 11 depending on either side of the pole 4 and serving to retain the block 8 against lateral displacement with respect to the pole.

The device as described is particularly adapted for supporting the rear axle of the vehicle, it being understood that when the axle rests within the socket 9 the pole 4 will extend forward to a point adjacent to the front axle, and may be secured thereto in any suitable manner as by lashing it to the axle with a rope or the like. To facilitate this connection the pole is provided with a ring 12 through which the rope may be passed.

The device may be used without change to support the front axle, but I prefer that when so used the axle should rest in the rear of the truck frame, and to this end the mechanism is made reversible so that the socket 8 may be supported on the pole on the rear side of the frame 3, and so that the frame may be turned to cause the horizontal portions thereof to extend rearwardly as shown in Fig. 1. This reversal is accomplished by withdrawing the pin 7, reversing the parts on the pole, and reinserting the pin. A single socket or block 8 may be employed for both axles, or if desired, separate blocks may be employed, and in the present instance I have shown the separate blocks for the front and rear axles, the recesses being of slightly different shape to adapt each to the particular axle which it is to support. It will be noted that in either position of the block and the frame, the axle will be supported directly above the axis of the supporting frame.

The pole 4 may be of any suitable length but here it is designed for use with automobiles of different sizes. It is preferably made of a length substantially equal with the wheel base of the largest automobile with which it may be desired to use it. When it is used with an automobile of a shorter wheel base, the end of the pole will project beyond the axle to which it is lashed, without in any way interfering with the operation of the truck. This pole may also be provided with a metal toe or reinforced tip as indicated at 13, thus enabling the pole to be used, either with or without the truck, to pry upon or lift the machine or vehicle in restoring the same to its proper position on the road preparatory to towing it to the garage.

The operation of the device will be readily understood from the foregoing description, and it will be apparent that I have provided a wrecking truck which can be very quickly and easily applied to either the front or the rear axle of an automobile, and when so applied will support the axle in a position which will permit the automobile to be towed along the road. Further, the device is of a simple compact construction having great strength and can be cheaply made and easily transported from one point to another. Further, while I have shown and described one embodiment of the invention I wish it to be understood that this form has been chosen for the purpose of illustration only and I do not desire to be limited to the details of the construction shown and described for obvious modifications will occur to one skilled in the art.

Having thus fully described my invention what I claim as new and wish to protect by Letters Patent, is:

1. In a device of the character described, wheels, a frame carried by said wheels, a pole connected with said frame and having means to support an axle thereon, said supporting means being arranged above and in substantially the same vertical plane with the axis of said wheels.

2. In a device of the character described, an axle, wheels mounted on said axle, a frame mounted on said axle and having a portion extending upwardly at one side of the vertical plane of said axle, a pole carried by said upwardly extending portion of said frame and having a supporting member arranged above said axle.

3. In a device of the character described, an axle, wheels mounted on said axle, a frame comprising L-shaped members, having their horizontal portions mounted on said axle, cross bars connecting said members, a pole extending between said cross bars and having a portion extending beyond said frame members to a point directly above said axle, and means to support one axle of a vehicle upon said portion of said pole.

4. In a device of the character described, an axle, wheels mounted on said axle, a frame comprising L-shaped members, having their horizontal portions mounted on said axle, a pole, and means to reversibly secure said pole at a point between its ends to the upright members of said frame.

5. In a device of the character described, an axle, wheels mounted on said axle, a frame mounted on said axle and having a portion extending upwardly at one side of the vertical plane of said axle, a pole reversibly mounted on said frame, and means for securing a supporting member to said pole, above said axle, when said pole is in either position.

6. In a device of the character described, an axle, wheels carried by said axle, a frame mounted on said axle, a pole mounted between its ends on said frame, and a socket having means for securing the same to said pole on either side of said frame.

7. In a device of the character described, an axle, wheels carried thereby, a frame mounted on said axle, and having transverse members spaced apart, a pole extending between said transverse members, a socket, a plate carrying said socket and adapted to extend between said pole, and one of said transverse members, and a pin adapted to extend through said transverse member, said plate and said pole.

8. A wrecking truck for vehicles comprisin a wheel supported frame, a pole secured near one end to said frame and having means adjacent to said frame for supporting one axle of a vehicle, and means for connecting the other end of said pole to the other axle of said vehicle.

9. A wrecking truck for vehicles, comprising a pole having a part adapted to engage and support one axle of a vehicle and having one end adapted to be secured to the other axle of said vehicle, and a wheeled support for that portion of said pole which supports the first mentioned axle.

In testimony whereof, I affix my signature in presence of two witnesses.

ROBERT T. HOLMES.

Witnesses:
JAMES C. WOODBURY.
WM. T. COUTANT.